United States Patent [19]
van Die

[11] Patent Number: 4,548,535
[45] Date of Patent: Oct. 22, 1985

[54] BALE PICK-UP CLAW APPARATUS

[76] Inventor: Willem van Die, Buitensingel 46, 9883 SH Oldehove, Netherlands

[21] Appl. No.: 558,636

[22] Filed: Dec. 6, 1983

[30] Foreign Application Priority Data

Dec. 7, 1982 [NL] Netherlands ............ 8204742

[51] Int. Cl.⁴ ............................................. A01D 87/12
[52] U.S. Cl. ..................... 414/111; 294/61; 294/105; 414/736; 414/740
[58] Field of Search ............. 414/24.5, 111, 721, 414/736, 740; 294/61, 67 BC, 81, 87 R, 107, 108, 105

[56] References Cited

U.S. PATENT DOCUMENTS

| | | | |
|---|---|---|---|
| 2,587,769 | 3/1952 | Rowe | 414/740 X |
| 3,052,366 | 9/1962 | Duncan | 414/740 X |
| 3,112,136 | 11/1963 | Hammond | 294/107 |
| 3,333,322 | 8/1967 | Toffolon | 294/87 R X |
| 3,420,564 | 1/1969 | Jensen | 414/736 X |
| 4,264,252 | 4/1981 | Jennings et al. | 414/24.5 |

FOREIGN PATENT DOCUMENTS

| | | | |
|---|---|---|---|
| 1129270 | 10/1968 | United Kingdom | 294/67 BC |
| 640699 | 1/1979 | U.S.S.R. | 414/24.5 |

Primary Examiner—Leslie J. Paperner
Attorney, Agent, or Firm—Winburn & Gray, Ltd.

[57] ABSTRACT

A pick-up claw apparatus connectible to a farm truck for handling baled material, in particular baled roughage, comprising a carrier beam which when the apparatus is coupled to the truck, is at right angles to the direction of travel of the vehicle. The carrier beam is connected to one or more hydraulically operated claw members, which are connected to the carrier beam in parallel and laterally reciprocating relationship, in a direction at right angles to the beam.

3 Claims, 9 Drawing Figures

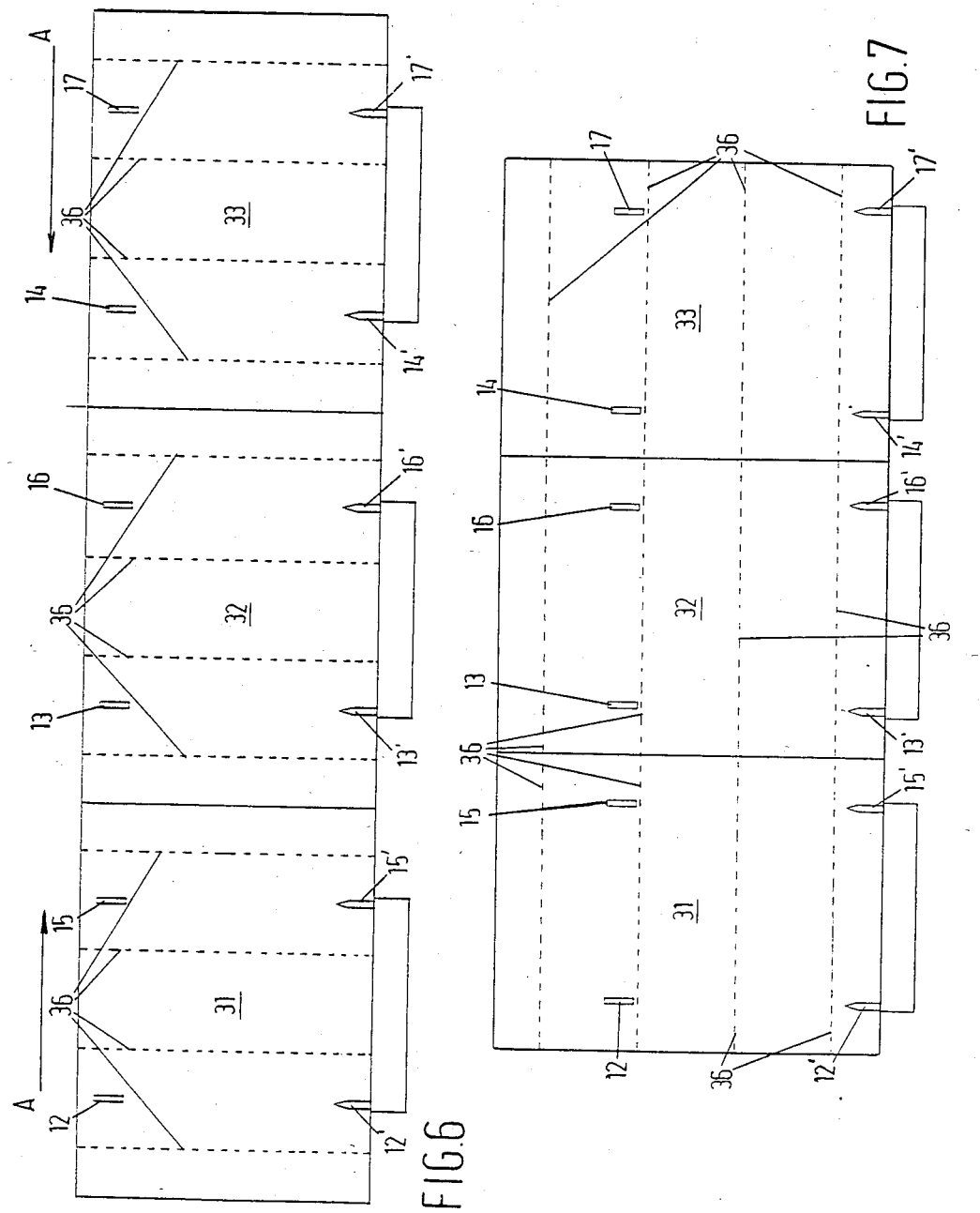

BALE PICK-UP CLAW APPARATUS

The invention relates to a pick-up claw apparatus connectible to a farm truck for handling a baled material, in particular baled roughage, comprising a carrier beam which, when the apparatus is coupled to the truck, is at right angles to the direction of travel of the vehicle, and which carrier beam is connected to one or more hydraulically operated claw members.

Such an apparatus is known from "Landbouwmechanisatie" 32 (1981) 12 (December) and is employed in the embodiment of a so-called three-pack claw apparatus besides a so-called large baling press, which is destined for pressing pre-dried grass, hay, lucerne, straw and other products to be pressed to large bales. The bales obtained with the large baling press have dimensions of 1.60×1.20×0.70 m and are kept together by a number of (mostly four) binding wires secured about the bales, at right angles to the longitudinal direction thereof, by means of provisions made on the large baling press.

Seen in cross-section, the bales are found in practice not to have the form of a regular rectangle, but the bale leaving the large baling press has a concave top and a convex bottom. The cause of this phenomenon seems to reside in the fact that the material to be pressed, which is present in the pressing channel, as regards height, has an unequal stacking density in the sense that the lower zone has a larger density than the upper zone. The binding wires are wound loosely about the bale when under squeeze pressure. When the squeeze pressure is removed, the bale expands as the pressed material springs back, settling around and against the binding wires. The spring-back takes place more strongly in the lower portion of the bale owing to the larger quantity of material available at that location due to the larger stacking density, with the above result of the bale form.

In the prior pick-up claw apparatus the carrier beam is a single, non-composite beam and can carry up to three claw members attached thereto, i.e., seen in the direction of travel of the farm truck, such as a lift truck, wheel loader or mechanical shovel, one in the centre at the front of the longitudinal side of the beam, and the other two at the ends thereof.

The pick-up claw members each have a number of pointed analogously formed claws (e.g. three), which claw members and hence the respective claws are hydraulically movable up and down in the vertical plane. The hydraulic operation of the pick-up claw apparatus, and of the claw members, respectively, takes place by means of the hydraulic system of the truck. The direct drive means for the claw members, such as the hydrocylinders, are also carried by the carrier beam. Taking into account that by pack always a combination of two or more bales is meant, the known three-pack claw apparatus picks up three bales at a time, loading the same e.g. on a wagon, mostly a flat open wagon, from the sides, for the bales to be transported further e.g. to the silage location. The three bales to be picked up are placed on the ground in pack with the sides of 1.20 m in co-extensive relationship. During the pick-up, first the central bale is seized and then the two outer bales, while the claws connected to the ends of the carrier beam are driven into the end faces of the pack, while exerting a compressive force in longitudinal direction of the pack.

The loading of the waggon with the three bales picked up by the three-pack claw apparatus then takes place in such a manner that the longitudinal direction of the pack is parallel to the longitudinal direction of the waggon, i.e., so that the dimension of 1.60 m is transverse to the longitudinal direction of the wagon. The transverse dimension of the wagon is normally chosen in such a way that the packs can be stacked in two rows, side by side, in the longitudinal direction of the truck. The total width of the load on the truck is therefore 3.20 m. The transport of such a wide load through the built-up area of a town or village is legally not permitted without anything more.

The prior pick-up claw apparatus stacks the packs at the silage location in such a manner that the faces of the bales having the sizes 1.60×1.20 m form the bearing surface of the stack and the dimension of 0.70 m is directed vertically.

By means of the known pick-up claw apparatus, analogously to the manner in which the packs were loaded on the truck, they are again unloaded from the truck at the destination, e.g. the silage location, i.e. from the side of the truck in packs of 3 bales all at once, while within the pack the bales having the dimension of 1.20 m, are again co-extensive. The stacking of the packs at the silage location takes place in such a manner that, working from the end of the silage stack to be formed, there is obtained an eventual silage stack having a form that can be described as an elongated parallelepiped of substantially rectangular cross-section, the packs being deposited with the dimension of 1.60 m in the longitudinal direction of the eventual silage stack and hence the dimension of 1.20 m of each of the three bales in co-extensive relationship and consequently transverse to the longitudinal direction of the eventuel silage stack. The width of said silage stack is therefore 3×1.20 m=3.60 m. This stacking method results in that the bales which, stacked onto each other, form the vertical longitudinal side faces of the silage stack have the tendency to fall over outwardly since the rounded form of each of the separate bales, resulting from the binding together of the bales by means of the binding wires, extends in that direction. As a result, in practice the bales are stacked not higher than three layers onto each other, so that the total height of the eventual silage stack is 3×0.70=2.10 m.

It is an object of the invention to provide a pick-up claw apparatus with which it is possible to load a waggon in such a manner that the loading width does not exceed the width permitted by the law and hence safe transport is automatically ensured and that, with a given loading capacity of the wagon the maximum cargo weight within the safety requirements set. After unloading the wagon, the packs should be stackable in such a manner that, while preserving the bearing surface, as regards each bale, the rounded form of the bales extends from the side face having the dimensions 1.60×1.20 m, in the transverse direction of the eventual silage stack to be formed, while the contemplated pick-up claw apparatus should be capable of picking up packs of different widths, so that this can be used in a more universal manner.

According to the invention the above objects are achieved by providing a pick-up claw apparatus of the above described type, which is characterized in that the claw members are connected to the carrier beam in parallel and laterally reciprocable relationship, in a direction at right angles to the beam.

In a further embodiment of the apparatus according to the invention, provided at least with three claw members, it is further characterized in that, for the lateral movability relative to each other, the claw members are connected to a carrier beam consisting of one or more telescoping beam assemblies.

The possibility of changing the length of the carrier beam by forming it, according to the invention, as a telescoping beam assembly, enables handling packs of variable widths. Thus, a pick-up claw apparatus according to the invention enables to pick up all at once up to 3 bales of the roughage, such as pre-dried grass etc., united to one pack with the sides of 1.60 m in co-extensive relationship, i.e., with a total pack length of 4.80 m. When loading a truck from the side with the pack for transport of the roughage to the silage location, this largest dimension of the pack of 4.80 m will conventionally be placed in longitudinal direction of the wagon, but in case the packs are stacked in two rows side by side on the truck, this will automatically lead to a load whose total width is 2×1.20 m=2.40 m. Such a load width complies with the statutory standard and a truck thus loaded can also be driven conveniently through the built-up area of a town or village.

The same pick-up claw apparatus according to the invention also allows for handling smaller packs, e.g. formed from only two bales or even a single bale, as will be explained in the following.

If a pack has been picked up with the apparatus according to the invention, it is possible to exert a variable squeeze pressure by means of an inwardly telescoping movement in longitudinal direction of the pack. To be ensured of a proper grip on the pack, it is effective if the claw member which, as is known per se, when the apparatus is coupled to the farm truck, comprises a curved member movable up and down in the vertical plane, is designed as a combination of the curved member as an upper claw portion and a coacting lower claw portion, while preferably the lower claw portion coacting with the upper portion is substantially straight and immovable, and consequently is an impaler. According to a particular preferred embodiment, the line of movement and the position of the upper claw portion relative to the lower portion will be chosen in such a manner that the pack to be picked up by the pick-up claw apparatus is subjected to an upward and, seen in the direction of travel, rearward movement, with the upper claw portions biting into the top face of the respective bales. As a result of this feature, the claws do not project beyond the pack, so that the packs can also be placed against a wall or can even be put away in a corner, e.g. of a shed.

When the packs are unloaded in reverse order as compared with the loading of the truck and stacked at the silage location beginning from the ends of the silage stack being formed, the result is a silage stack 3×1.60=4.80 m wide, and, as regards each bale, the rounded form extends in the transverse direction of the silage stack. As a result, only the bales that, stacked onto each other, form the end faces of the silage stack, have the tendency to fall over outwardly. However, in connection with the appreciably smaller surface area of the end faces of the silage stack as compared with the vertical longitudinal side faces thereof, which may be as long as some tens of meters, a much smaller member of bales tend to fall over in longitudinal direction at the ends of the silage stack than is the case with the silage stack formed with the pick-up claw apparatus now used in the art, in which the bales forming the vertical longitudinal side faces tend to fall over. One result of this is that the use of the pick-up claw apparatus according to the invention permits forming higher silage stacks.

In practice, by using the pick-up claw apparatus according to the invention, effective silage stacks can be formed which comprise up to 4 layers of bales and the total height of which is therefore 4×0.70=2.80 m, thereby also achieving a higher efficiency of the ground surface available for the silage stack. Moreover, by stacking the bales of the top layer in off-set relationship to that of the subjacent layer, the falling-over of the stack at the ends of the silage stack is prevented as well.

One embodiment of the pick-up claw apparatus according to the invention will now be described, by way of example, with reference to the accompanying drawings, in which:

FIGS. 6–9 are diagrammatic top views of two gripping possibilities attainable with the three-pack claw apparatus, i.e. of a pack of 3 bales (FIG. 6 and FIG. 7), and of a pack of 2 bales, respectively (FIG. 8 and FIG. 9).

Figure 1:
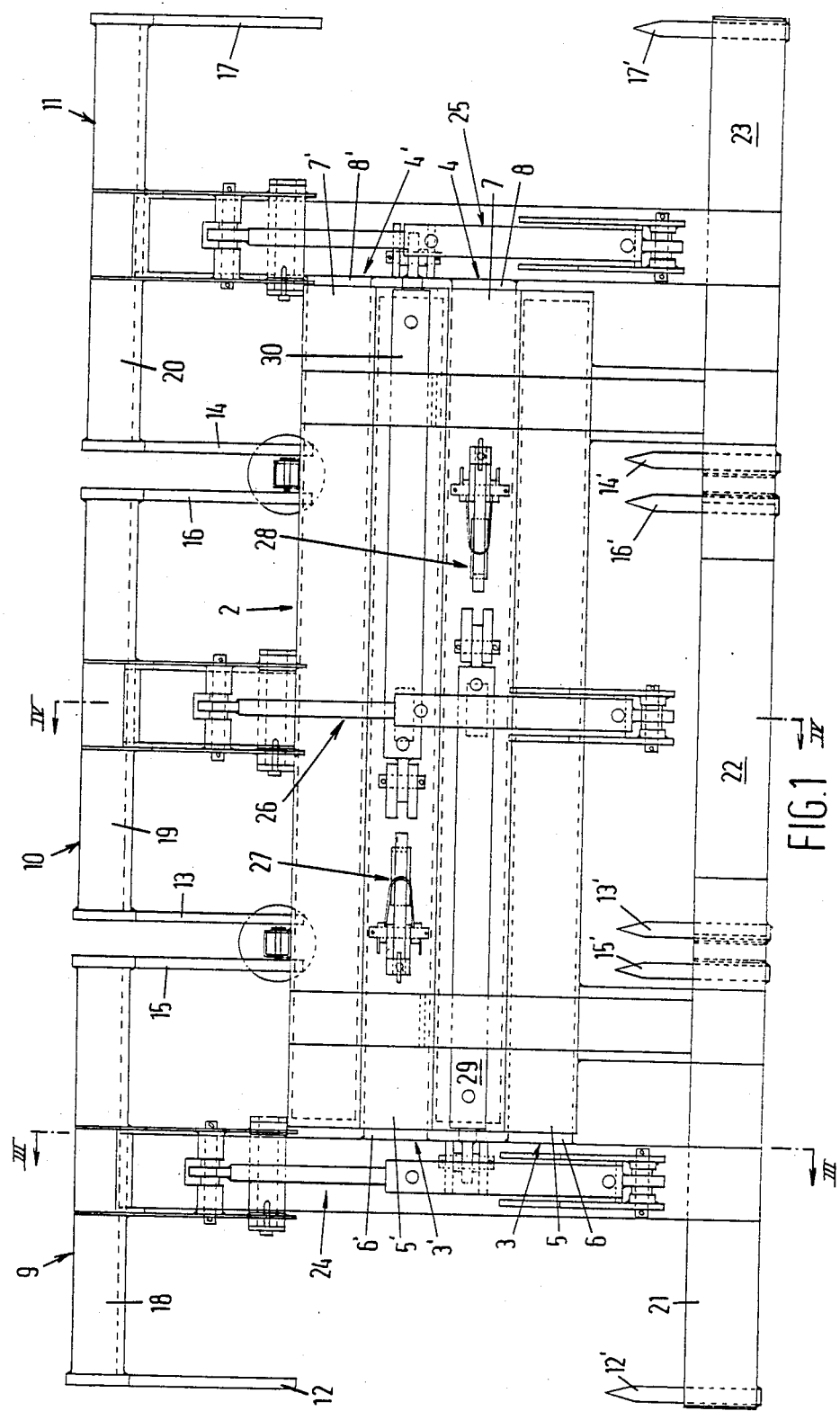
FIG. 1 is a top view of a three-pack pick-up claw apparatus according to the invention, the carrier beam of which is not telescoped outwardly.
Figure 2:
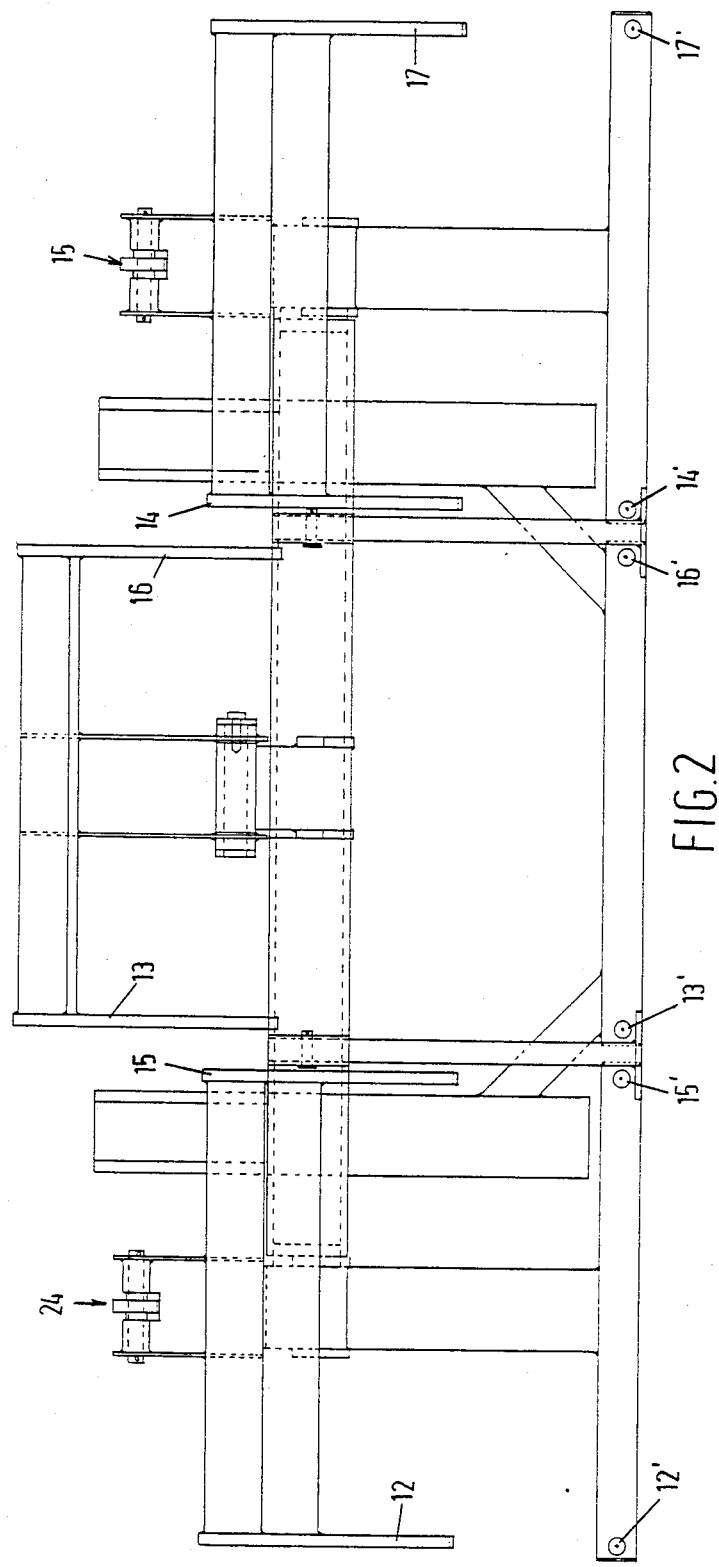
FIG. 2 is a front view of the three-pack claw apparatus.
Figure 3:
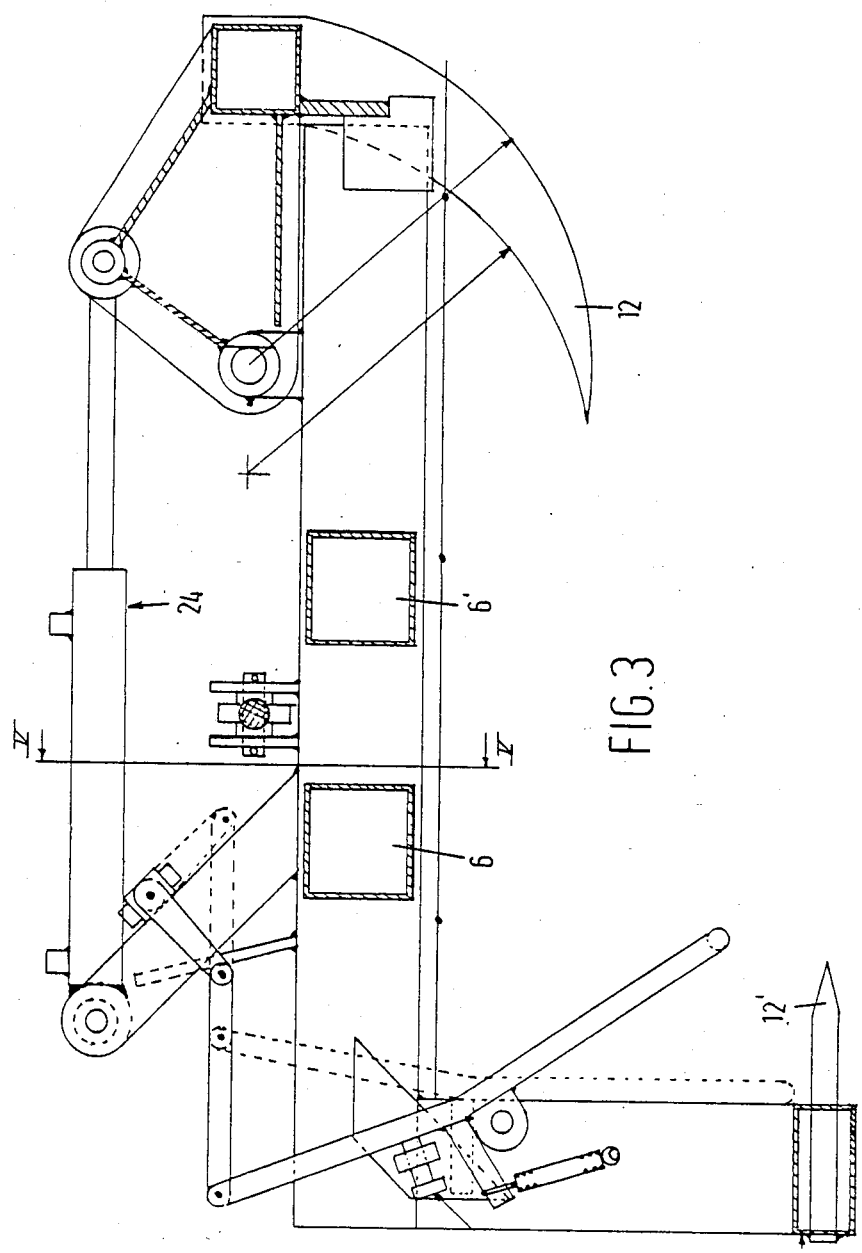
FIG. 3 is a cross-section on the line III—III of FIG. 1.
Figure 4:
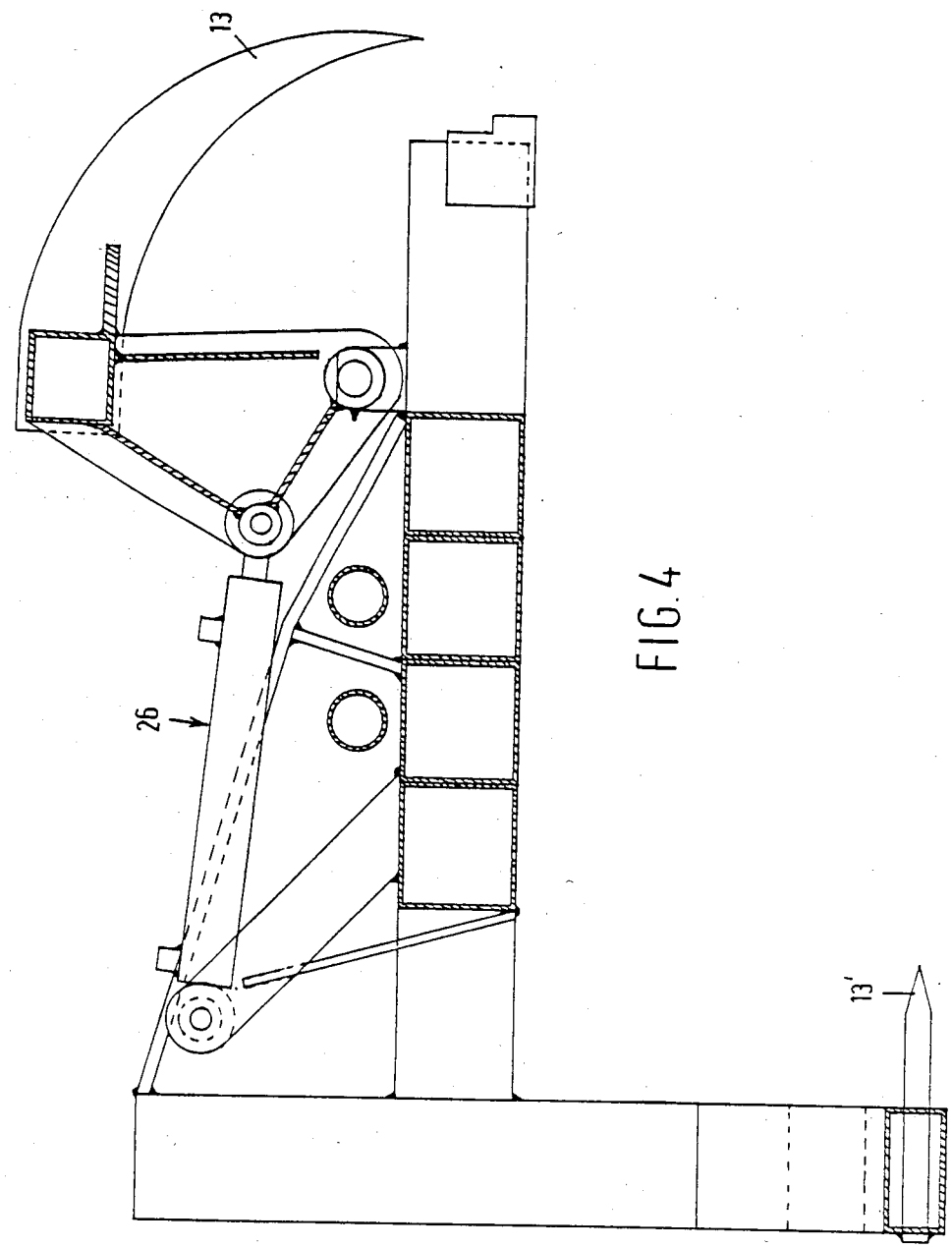
FIG. 4 is a cross-section on the line IV—IV of FIG. 1.
Figure 5:
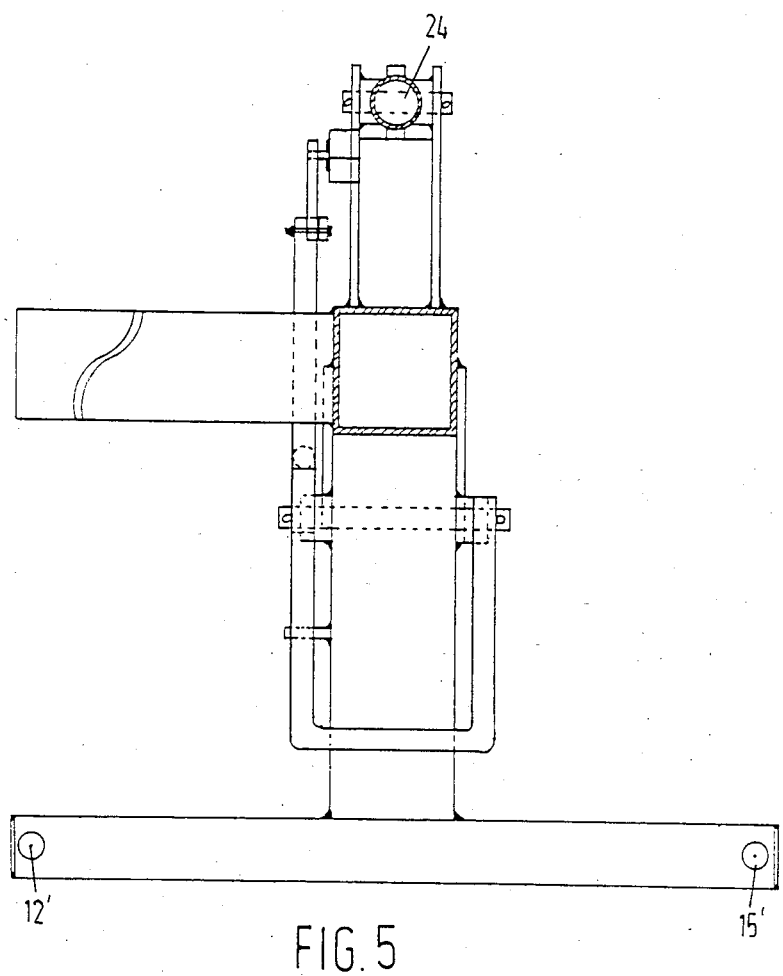
FIG. 5 is a cross-section on the line V—V of FIG. 3.

In the drawing, 1 indicates a three-pack pick-up claw apparatus with carrier beam 2, being an assembly of two pairs of telescoping box beam assemblies 3, 3' and 4,4'. The telescoping box beam assemblies, pertaining to the pair 3, 3', comprise outer beams 5, 5' and inner beams 6, 6', while the pair 4, 4' comprise outer beams 7, 7' and inner beams 8, 8'.

Connected to the carrier beam are three claw carrier frames 9, 10 and 11.

The carrier frame 9 is welded onto the ends of the outwardly and inwardly telescoping inner beams 6, 6' of the beam assemblies 3, 3', two frame beams 18 and 21 forming part of said claw carrier frame 9. The ends of the frame beam 18 are connected to upper claws 12 and 15 and the ends of the frame beam 21 to lower claws 12' and 15'.

The claw carrier frame 9 furthermore carries a hydrocylinder-and-piston assembly 24, which is disposed on the claw carrier frame 9 in such a manner that the frame beam 18 can be rotated thereby and hence the upper claws 12, 15 can be moved up and down in the vertical plane, thereby coacting with the fixed, tooth-shaped lower claws 12', 15' for the purpose of gripping or disengaging the bale-shaped load. The position of the coacting upper and lower claws 12, 12' and 15, 15', with their attachment to the carrier frame 9, is chosen in such a manner that, when the bale-shaped load is gripped, a rearward and upward movement is imparted thereto.

Analogously to the suspension construction pertaining to the beam assemblies 3, 3', the outwardly and inwardly telescoping inner beams 8, 8' of the beam assemblies 4, 4' are affixed to claw carrier frame 11, comprising frame beams 20 and 23, to the ends of which there are attached the upper claws 14, 17, and lower claws 14', 17', respectively, coacting for the purpose of engaging and disengaging the bale-shaped load, said lower claws being again designed as fixed tooth-shaped elements.

The claw carrier frame 11 is further fitted with the hydrocylinder-and-piston assembly 25 with which, eventually, the upper claws 14 and 17 are again synchronously movable up and down in the vertical plane.

Between the claw carrier frames 9 and 11 movable outwardly and inwardly by means of the telescoping inner beams 6, 6', and 8, 8', respectively, there is provided a third carrier frame 10, which, however, is affixed to the outer beams 5, 5', 7, 7' and hence is immovable and stationary. For that matter, analogously to the movable claw carrier frames 9, 11, the fixed claw carrier frame 10 is provided with frame beams 19, 22; upper claws 13, 16, and fixed tooth-shaped lower claws 13', 16' movable in the vertical plane, as well as a hydrocylinder-and-piston assembly 26.

The telescoping beam assemblies 3, 3' coacting for the outward and inward movement of the claw carrier frame 9 with the upper claws 12, 15 and lower claws 12', 15' are provided with a blocking element 27, not further described, for limiting the telescoping movement of the inner beams. Similarly, the telescoping beam assemblies 4, 4' are provided with a blocking element 28.

The telescoping movement of the inner beams 6, 6', and 8, 8', respectively, takes place by means of the hydrocylinder-and-piston assembly 29, 30.

Naturally, the three-pack pick-up claw 1 is further fitted with coupling means, not further shown, by means of which it can be coupled e.g. to a wheel loader, and with connection means through which the hydraulic system of the three-pack pick-up claw 1 can be connected to the hydraulic system of the wheel loader.

The three-pack pick-up claw can be operated as follows.

The bales of dimensions 1.60×1.20×0.70 m kept together by binding wires 36 and formed by means of a so-called large baling press during the gathering of e.g. pre-dried silage grass are installed side by side in groups of three bales 31, 32, 33 (FIG. 6) and formed into one pack. The precise width of the carrier beam is adjusted by moving the inner beams 6, 6' and 8, 8' outwardly up to the maximally extended position. Subsequently, the pick-up claw apparatus is transported in the direction of the pack, the lower claws are inserted in the pack and the pack is further gripped by the downward movement of the upper claws and the penetration of said claws in the top face of the bales. By moving the inner beams 6, 6' and 8, 8' inwardly, the pack is compressed in the direction of the arrows A (FIG. 6), in which condition the pack can be conveniently lifted and transported to a truck.

The three bales can also be formed to a pack, as now conventional in the art in question, and as shown in FIG. 7. The inner beams 6, 6' and 8, 8' will then be moved outwardly a smaller distance, determined by adjustment of the blocking elements 27, 28.

Figure 8:
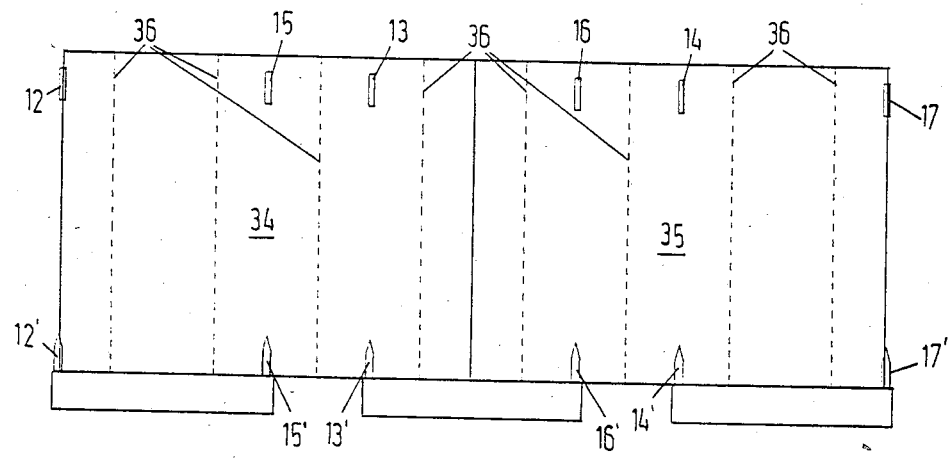
Figure 9:
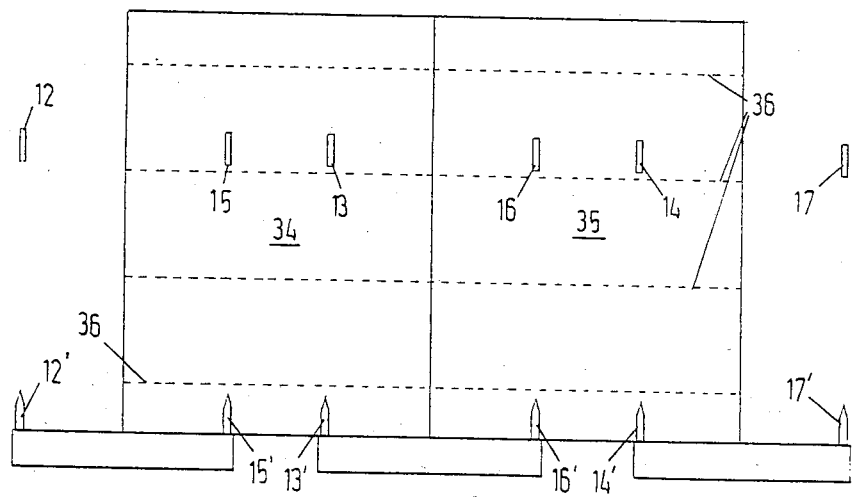

The three-pack pick-up claw apparatus, also permits handling packs that consist of two bales 34, 35, as shown in FIGS. 8, 9.

Naturally, alterations of the apparatus discussed in the above and shown in the drawings are possible without departing from the scope of the invention.

What I claim is:

1. A pick-up apparatus connectible to a farm vehicle for handling baled material, in particular baled roughage, comprising a carrier beam which, when the apparatus is coupled to the vehicle, is at right angles to the direction of travel of the vehicle, and which carrier beam is connected to at least two hydraulically operated claw members, characterized in that each said claw member includes an upper curved claw portion adapted for movement in the vertical plane and a coacting lower straight and immovable claw portion, the claw members are connected to the carrier beam substantially perpendicular thereto and substantially parallel to one another, said apparatus including means for effecting lateral reciprocating movement of said claw members, the lateral and vertical movement and the position of said upper claw portion relative to said lower claw portion being chosen such that the pack of baled material to be picked up by said pick-up apparatus is subjected to an upward and backward movement toward the vehicle attached to said pick-up apparatus when lifted.

2. An apparatus according to claim 1, comprising at least three claw members, characterized in that for the lateral, relative movability the claw members are connected to a carrier beam composed of one or more telescoping beam assemblies.

3. An apparatus according to claim 2, characterized in that the carrier beam comprises two pairs of telescoping, parallel beam assemblies and the apparatus comprises three pairs of claw members, to be divided into two outer and one inner pair, each of the two outer pairs being fixedly connected to one pair of the corresponding telescoping beams, associated with each of the two pairs of telescoping beam assemblies, the inner pair being connected to the fixed beams of the front pair of telescoping beam assemblies, as seen in the direction of travel.

* * * * *